US009389446B2

(12) United States Patent
Zhang et al.

(10) Patent No.: US 9,389,446 B2
(45) Date of Patent: Jul. 12, 2016

(54) FRAME ASSEMBLY COMPRISING FIRST AND SECOND SUPPORT PORTIONS AND LIQUID CRYSTAL DISPLAY DEVICE

(71) Applicants: Boe Technology Group Co., Ltd., Beijing (CN); Beijing Boe Display Technology Co., Ltd., Beijing (CN)

(72) Inventors: Zhidan Zhang, Beijing (CN); Yoon Dae Keun, Beijing (CN); Qing Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 14/102,225

(22) Filed: Dec. 10, 2013

(65) Prior Publication Data

US 2014/0160393 A1 Jun. 12, 2014

(30) Foreign Application Priority Data

Dec. 12, 2012 (CN) .......................... 2012 1 0537675

(51) Int. Cl.
*G02F 1/1335* (2006.01)
*G02F 1/1333* (2006.01)

(52) U.S. Cl.
CPC .................... *G02F 1/133308* (2013.01); *G02F 2001/133314* (2013.01); *G02F 2001/133317* (2013.01); *G02F 2201/46* (2013.01); *G02F 2201/503* (2013.01)

(58) Field of Classification Search
CPC ................ G02F 2001/133314; G02F 2201/46; G02B 6/0088
USPC ...................................................... 349/63, 65
See application file for complete search history.

(56) References Cited

U.S. PATENT DOCUMENTS

2007/0200969 A1 8/2007 Hsu et al.
2009/0128731 A1* 5/2009 Kwon et al. .................... 349/58
(Continued)

FOREIGN PATENT DOCUMENTS

CN 1556433 A 12/2004
CN 101936509 A 1/2011
(Continued)

OTHER PUBLICATIONS

English translation of Chinese Office Action dated Mar. 10, 2015, for corresponding Chinese Application No. 201210537675.0.
English translation of first Office Action received in corresponding Chinese Application No. 2012105376750, dated Nov. 24, 2014.

*Primary Examiner* — Paul Lee
(74) *Attorney, Agent, or Firm* — Kinney & Lange, P.A.

(57) ABSTRACT

There are disclosed a frame assembly and liquid crystal display device for reducing leakage of light around a liquid crystal panel and improving display quality of the liquid crystal display device. The frame assembly includes a backboard in which a receiving portion is formed, a front frame mounted on the backboard around an periphery of the backboard and a buffer frame provided between the backboard and the front frame, wherein the backboard is provided with a first support portion, which is folded from a periphery of the backboard towards inside of the receiving portion so as to support the buffer frame. With the backboard of the above configuration, the support stability for the glue frame can be increased, and the deformation of the glue frame under a reaction force from the liquid crystal panel can be reduced, thereby reducing leakage of light around the liquid crystal panel and improving a display quality of the liquid crystal display device.

10 Claims, 4 Drawing Sheets

(56) References Cited

U.S. PATENT DOCUMENTS

2009/0147171 A1\* 6/2009 Yang et al. ................... 349/58
2010/0014026 A1\* 1/2010 Inoue ................ G02B 6/0031
                                                         349/65
2010/0165244 A1\* 7/2010 Shin et al. ................... 349/62

FOREIGN PATENT DOCUMENTS

| CN | 102691934 A | 9/2012 |
| CN | 102691964 A | 9/2012 |
| JP | 2001125099 A | 5/2001 |
| JP | 2005055736 A | 3/2005 |

\* cited by examiner

FRAME ASSEMBLY COMPRISING FIRST AND SECOND SUPPORT PORTIONS AND LIQUID CRYSTAL DISPLAY DEVICE

CROSS-REFERENCE TO RELATED APPLICATION

This application claims the benefit of Chinese Patent Application No. 201210537675.0 filed on Dec. 12, 2012 in the State Intellectual Property Office of China, the whole disclosure of which is incorporated herein by reference.

BACKGROUND OF THE INVENTION

1. Field of the invention

Various embodiments of the present invention relate to a technical field of liquid crystal display, and more particularly, to a frame assembly and a liquid crystal display device including the frame assembly.

2. Description of the Related Art

A liquid crystal display device generally includes a frame assembly, and a liquid crystal panel and a backlight source provided within the frame assembly; wherein the backlight source provides a light source for the liquid crystal panel so as to achieve an image display.

As shown in FIG. 1, a frame assembly in prior art includes a backboard 10, a glue frame 16 located on the backboard 10 and a front frame 15 covering over the glue frame 16; wherein the front frame 15 and the glue frame 16 are fixed to the backboard 10 by a bolt 17. The backlight source and the liquid crystal panel 20 are located within the frame assembly. Specifically, The backlight source comprises a bracket 11 provided on the backboard 10, a reflection sheet 12 provided on the bracket 11, a light guide plate 13 provided on the reflection sheet 12, and a plurality of light source 14 fixed on the bracket 11 near side edges of the light guide plate 13. The liquid crystal panel 20 is located between the glue frame 16 and the front frame 15. Light emitted by the light source 14 is provided to the liquid crystal panel 20 through the reflection sheet 12, the light guide plate 13 and an optical film so that the liquid crystal panel 20 can achieve an image display.

However, it is a disadvantage to a support stability for the glue frame 16 when a support portion 101 is formed on the backboard 10 to support glue frame 16, and the glue frame 16 will be easily deformed under a reaction force from the liquid crystal panel 20, so that a flatness of a mounting surface of the glue frame 16 for mounting the liquid crystal panel is reduced, resulting in leakage of light around the liquid crystal panel 20, which will deteriorate a display quality of the liquid crystal display device.

SUMMARY OF THE INVENTION

In view of the above, an object of the present invention is to provide a frame assembly and a liquid crystal display device for reducing leakage of light around the liquid crystal panel and improving the display quality of the liquid crystal display device.

According to an inventive embodiment of the present invention, there is provided a frame assembly, including:
a backboard in which a receiving portion is formed;
a front frame mounted on the backboard around an periphery of the backboard; and
a buffer frame provided between the backboard and the front frame,
wherein the backboard is provided with a first support portion, which is folded from a periphery of the backboard towards inside of the receiving portion so as to support the buffer frame.

According to an embodiment of a further aspect of the present invention, there is provided a liquid crystal display device, including:
the frame assembly as defined in the above embodiment;
a backlight source provided within the receiving portion of the frame assembly; and
a liquid crystal panel mounted on a front portion of the backlight source by means of the front frame and the buffer frame of the frame assembly.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
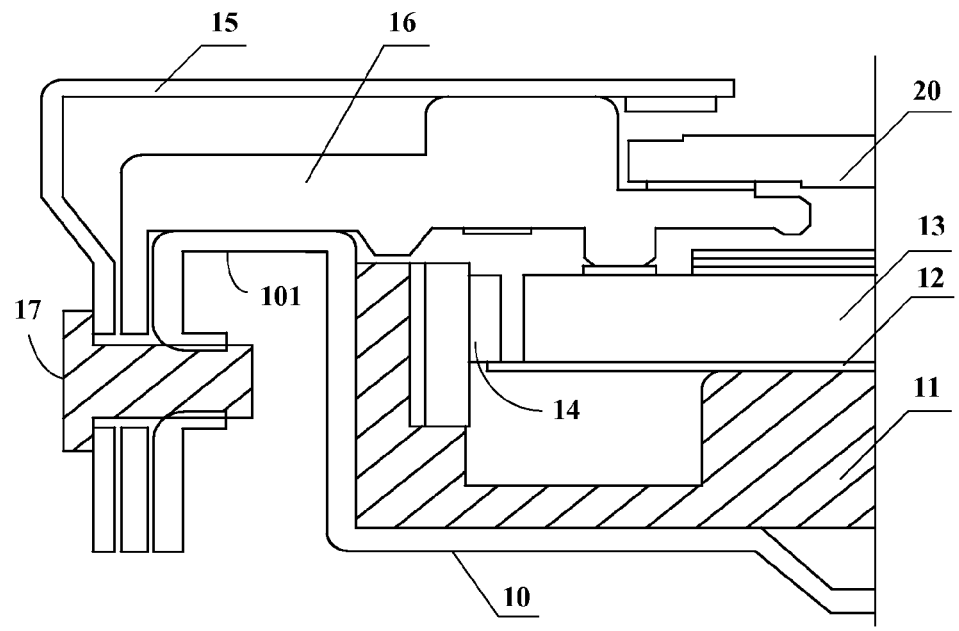
FIG. 1 is a structural diagram of one frame assembly in prior arts.

The backboard in prior arts has a poor support stability for the glue frame, and the glue frame will be easily deformed under a reaction force from the liquid crystal panel, so that a flatness of a mounting surface of the glue frame for mounting the liquid crystal panel is deteriorated, resulting in leakage of light around the liquid crystal panel, which will negative affect a display quality of the liquid crystal display device.

In view of this, a general inventive concept of the present invention provides an improved frame assembly, in which a deformation of a glue frame in the frame assembly under a reaction force from a liquid crystal panel is restrained by changing configuration of the backboard, so that a better flatness is provided in a mounting surface of a glue frame for mounting the liquid crystal panel, thereby reducing leakage of light around the liquid crystal panel and improving a display quality of the liquid crystal display device.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

Figure 2:
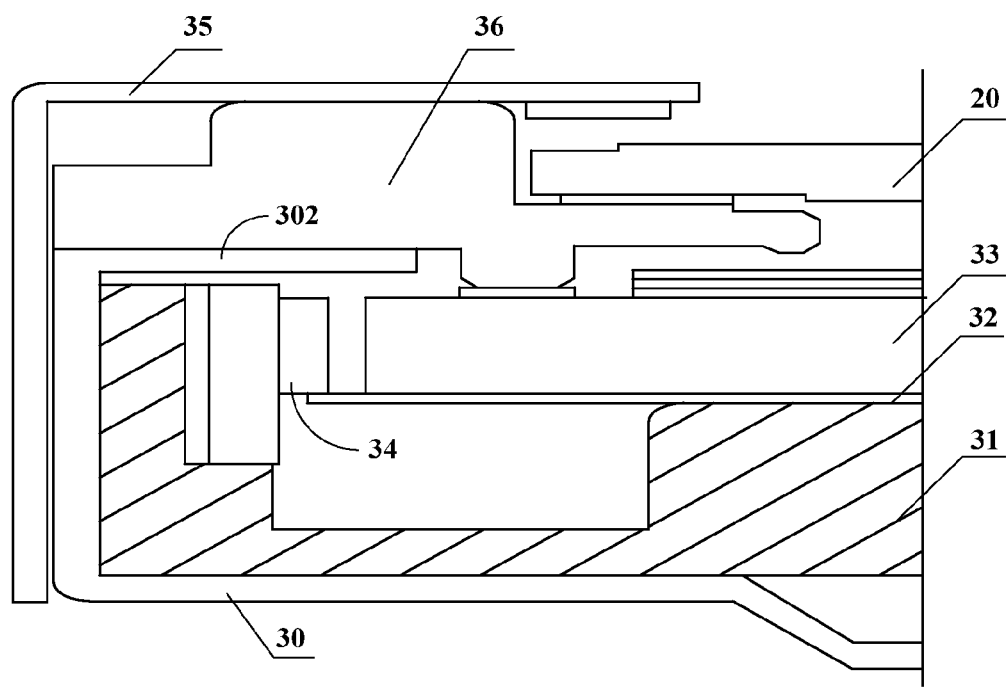
FIG. 2 is a structural diagram of a frame assembly according to first exemplary embodiment of the present invention.
Figure 3:
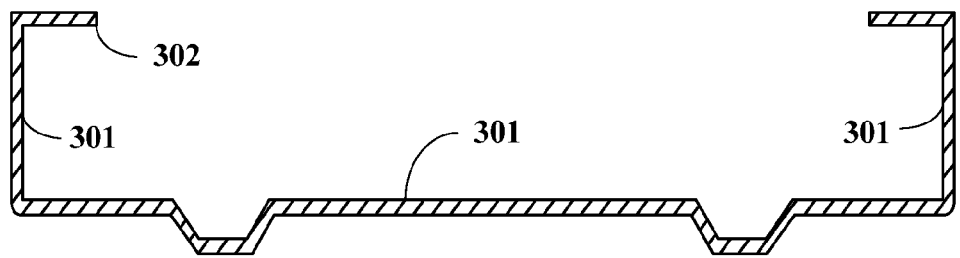
FIG. 3 is a cross section view of a backboard shown in FIG. 2.

As show in FIGS. 2 and 3, according to first exemplary embodiment of the present invention, there is provided a frame assembly, including: a backboard 30 in which a receiving portion 301 is formed; a front frame 35 mounted on the backboard 30 around an periphery of the backboard 30; and a buffer frame provided between the backboard 30 and the front frame 35, wherein the buffer frame is covered with the front frame 35, the backboard 30 has a first support portion 302, which is folded from a periphery of the backboard 30 towards inside of the receiving portion 301 so as to support the buffer frame. In one exemplary embodiment, the buffer frame may be a glue frame 36 made of, for example, rubber materials, the present invention, however, is not limited to this. In other embodiments, the buffer frame may be an annular structure made of any materials having good elasticity and sealability, such as elastic resin materials.

Specifically, in the present embodiment, the frame assembly includes the backboard 30, the glue frame 36 provided on the first support portion 302 of the backboard 30, and the front frame 35 fixed on a side surface of the backboard 30, wherein the front frame 35 covers over the glue frame 36. A backlight source is provided within the receiving portion 302 of the backboard 30. The backlight source includes a bracket 31 located at bottom of the receiving portion 302, a reflection sheet 32 adhered on the bracket 31, a light guide plate 33 located on the reflection sheet 32, an optical film adhered on the light guide plate 33, and a plurality of light sources 34 fixed on the bracket 31 near side edges of the light guide plate 33.

Further, a liquid crystal panel 20 is mounted on a front portion of the backlight source by means of the front frame 35 and the buffer frame of the frame assembly. Specifically, the liquid crystal panel 20 is mounted on a mounting surface of the glue frame 36 between the glue frame 36 and front frame 35.

In the present embodiment, the first support portion 302 of the backboard 30 is folded from a periphery of the backboard 30 towards inside of the receiving portion 301 so as to form a flat upper surface in contact with the glue frame 36, the upper surface of the first support portion 302 is parallel to the mounting surface of the glue frame 36 for supporting the liquid crystal panel and extends towards a center of the glue frame 36. With the first support portion 302 having such configuration, the glue frame 36 can be stably supported, and a deformation of the glue frame 36 under a reaction force from a liquid crystal panel 20 is restrained, so that a better flatness is exhibited in the mounting surface of the glue frame 36, thereby reducing leakage of light around the liquid crystal panel 20 and improving a display quality of the liquid crystal display device.

Figure 4A:
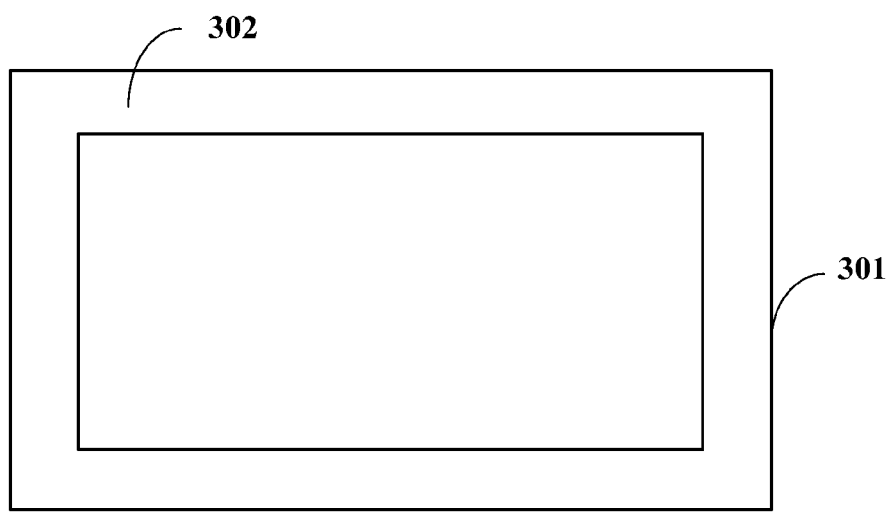
FIG. 4a is a plan view of one exemplary embodiment of the backboard shown in FIG. 2.

As shown in FIG. 4a, the first support portion 302 is formed into a continuous annular structure in one exemplary embodiment. In other words, the first support portion 302 is an annular structure provided on inner side of the receiving portion 301, and upper surface of the annular structure is parallel to the mounting surface of the glue frame 36.

Figure 4B:
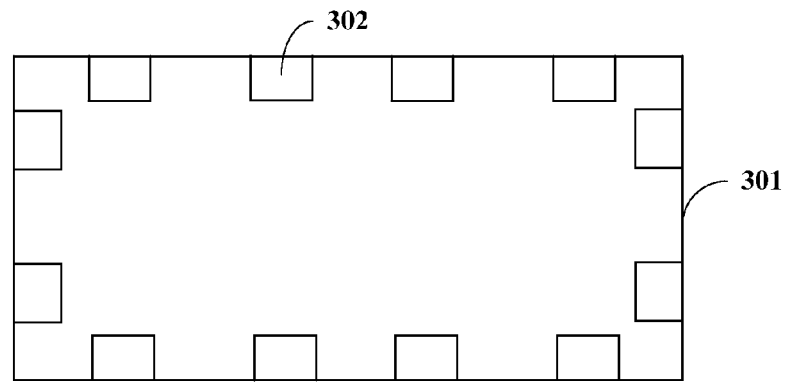
FIG. 4b is a plan view of another exemplary embodiment of the backboard shown in FIG. 2.

As shown in FIG. 4b, in an alternative exemplary embodiment, the first support portion 302 includes a plurality of support plates arranged to be spaced apart from each other; in other words, the first support portion 302 is formed by a plurality of support plates arranged around the receiving portion 301 and spaced apart from each other.

Figure 5:
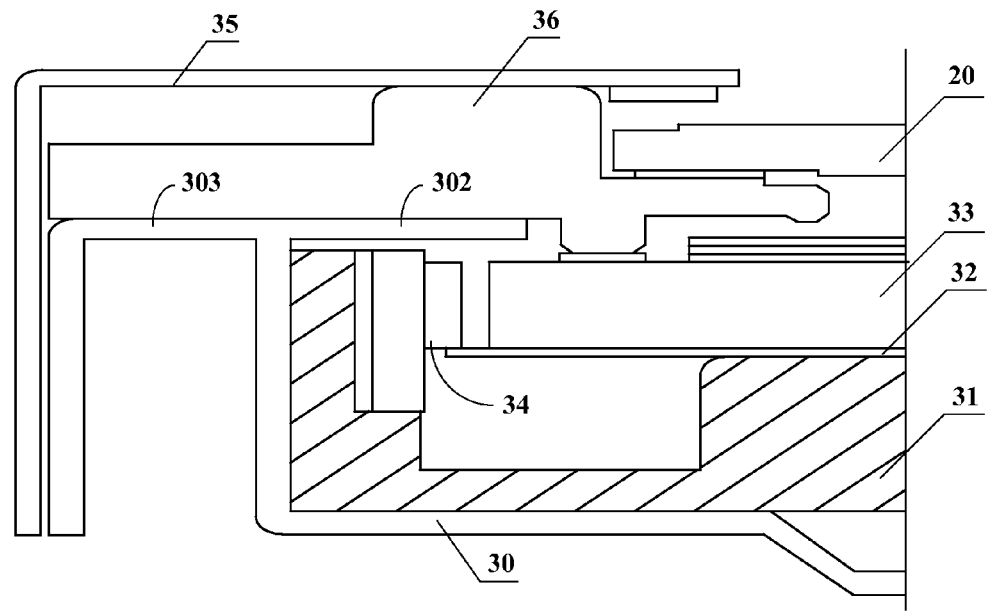
FIG. 5 is a structural diagram of a frame assembly according to second exemplary embodiment of the present invention.
Figure 6:
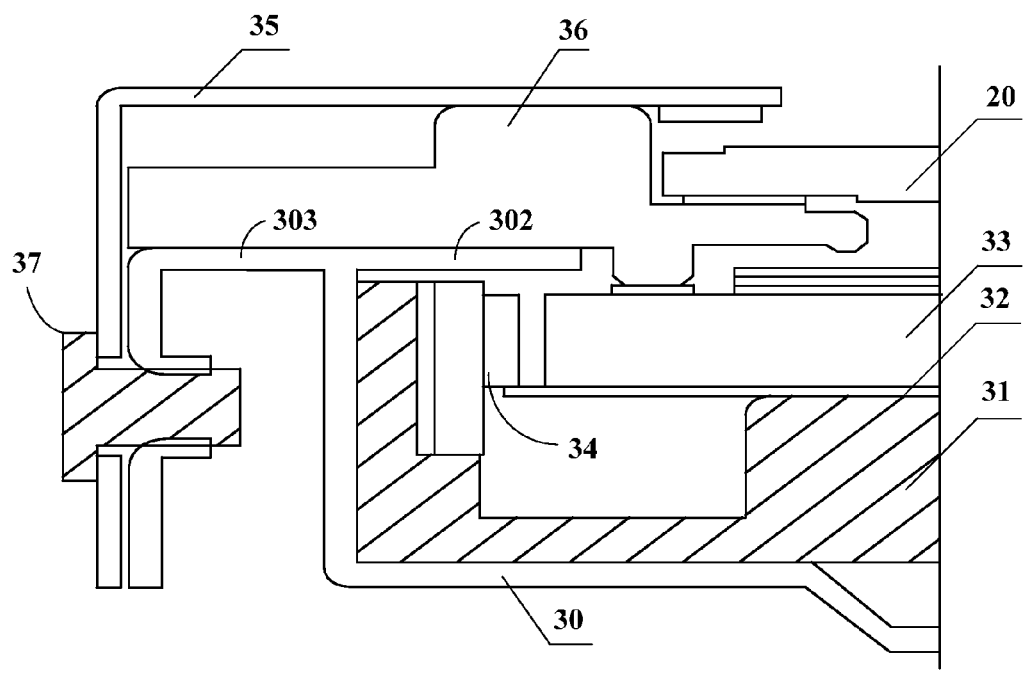
FIG. 6 is a structural diagram of a frame assembly according to third exemplary embodiment of the present invention.

According to second and third exemplary embodiments of the present invention as shown in FIGS. 5 and 6, in order to further improve support stability of the backboard 30 for glue frame 36, the backboard 30 further has a second support portion 303 folded from the periphery of the backboard 30 towards outside of the receiving portion 301, the second support portion 303 is configured to support the glue frame 36 in cooperation with the first support portion 302. Use of the second support portion 303 can further improve support stability of the backboard 30 for glue frame 36 and ensure flatness of the mounting surface of the glue frame 36, thereby reducing leakage of light around the liquid crystal panel and improving a display quality of the liquid crystal display device.

In a further exemplary embodiment, the first support portion 302 is provided with a specular reflection layer on a surface thereof facing a bottom surface of the receiving portion 301. Specifically, the specular reflection layer may be coated on a lower surface of the first support portion 302. In another embodiment, the specular reflection layer is provided as a reflector adhered on the lower surface of the first support portion 302 by adhesive, and thus light irradiated on the specular reflection layer can be reflected to the light guide plate 33, thereby improve an availability of light; meanwhile, dark portions between adjacent light sources 34 can be reduced so as to relieve Hot Spot phenomenon. The Hot Spot phenomenon means that a phenomenon in which a region close to the light source appears brighter than that away from the light source when viewed from the plane of the light guide plate.

As shown in FIG. 6, the front frame 35 is fixed on the backboard 30 by a bolt 37, and the front frame 35 is directly abutted on the backboard 30 at their fixed position. Specifically, both of the front frame 35 and the second support portion 303 have a substantially L shape in cross section so that the front frame 35 and the backboard 30 can be fixed by the bolt 37 at side of the backboard 30, the present invention, however, is not limited to this. In the exemplary embodiments as shown in FIGS. 2 and 5, the front frame 35 is fixed on the backboard 30 in a snap-fit manner, and the front frame is directly abutted on the backboard at their fixed position. For example, the front frame 35 is provided with several hooks and the backboard 30 is provided with a corresponding number of snap fasteners, so that the front frame 35 and the backboard 30 can be fixed by snap-fit between the hooks and the snap fasteners. Compared to an engagement manner in which the side frame, the glue frame and the backboard are directly jointed at their fixed position, the present invention, in which only the front frame 35 and the backboard 30 are jointed at their fixed position, can reduce deformation of the glue frame 36 due to deformation of the front frame 35 of the backboard 30, thereby further reducing leakage of light around the liquid crystal panel and improving a display quality of the liquid crystal display device.

According to an embodiment of a further aspect of the present invention, there is provided a liquid crystal display device, including: the frame assembly as defined in the above embodiments, a backlight source provided within the receiving portion 301 of the frame assembly, and a liquid crystal panel 20 mounted on a front portion of the backlight source by means of the front frame 35 and the buffer frame of the frame assembly. In the liquid crystal display device of the present invention, the backlight source includes a bracket 31 located at bottom of the receiving portion 302, a reflection sheet 32 adhered on the bracket 31, a light guide plate 33 located on the reflection sheet 32, an optical film adhered on the light guide plate 33, and a plurality of light sources 34 fixed on the bracket 31 at side edges of the light guide plate 33.

In one exemplary embodiment, an openable and closable opening may be provided on one side of the backboard 30, the assembled backlight source is installed within the receiving portion 301 through the opening and then the opening is closed, so that the liquid crystal display device is assembled. In another embodiment, the first support portion, as well as the second support portion, is removably mounted on the backboard 30 by using engagement members such as bolts or adhesives after the assembled backlight source is installed within the receiving portion 301. In a further embodiment, the first support portion and/or the second support portion is formed by bending side portions of the backboard 30 so as to hold the backlight source in the receiving portion after the assembled backlight source is installed within the receiving portion 301.

In the frame assembly provided by the present invention, the backboard has the receiving portion and the first support portion folded towards to inside of the receiving portion to support the glue frame, and the glue frame is fixed on the first support portion of the backboard. In this way, the support stability of the support portion of the backboard for the glue frame can be increased, and the deformation of the glue frame under the reaction force from the liquid crystal panel can be reduced, so that a better flatness is exhibited in the mounting surface of the glue frame for mounting the liquid crystal panel, thereby reducing leakage of light around the liquid crystal panel and improving a display quality of the liquid crystal display device.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A frame assembly including:
   a backboard in which a receiving portion is formed;
   a front frame mounted on the backboard around an periphery of the backboard; and
   a buffer frame provided between the backboard and the front frame, and made of materials having elasticity and sealability,
   wherein the backboard is provided with a first support portion, which is integrally and perpendicularly folded from a periphery of the backboard towards an inside of the receiving portion so as to support the buffer frame, and a second support portion, which is integrally and perpendicularly folded from the periphery of the backboard toward an outside of the receiving portion to have the same height as the first support portion and configured to support the buffer frame in cooperation with the first support portion; and
   wherein the first support portion is provided with a specular reflection layer on a surface thereof facing a bottom surface of the receiving portion.

2. The frame assembly according to claim 1, wherein the first support portion is formed into a continuous annular structure.

3. The frame assembly according to claim 1, wherein the first support portion includes a plurality of support plates arranged to be spaced apart from each other.

4. The frame assembly according to claim 1, wherein the front frame is fixed on the backboard by a bolt, and the front frame is directly abutted on the backboard at their fixed position.

5. The frame assembly according to claim 1, wherein the front frame is fixed on the backboard in a snap-fit manner, and the front frame is directly abutted on the backboard at their fixed position.

6. A liquid crystal display device including:
   the frame assembly as defined in claim 1;
   a backlight source provided within the receiving portion of the frame assembly; and
   a liquid crystal panel mounted on a front portion of the backlight source by means of the front frame and the buffer frame of the frame assembly.

7. The liquid crystal display device according to claim 6, wherein the first support portion is formed into a continuous annular structure.

8. The liquid crystal display device according to claim 6, wherein the first support portion includes a plurality of support plates arranged to be spaced apart from each other.

9. The liquid crystal display device according to claim 6, wherein the front frame is fixed on the backboard by a bolt, and the front frame is directly abutted on the backboard at their fixed position.

10. The liquid crystal display device according to claim 6, wherein the front frame is fixed on the backboard in a snap-fit manner, and the front frame is directly abutted on the backboard at their fixed position.

* * * * *